United States Patent
Zu et al.

(10) Patent No.: US 10,491,090 B2
(45) Date of Patent: Nov. 26, 2019

(54) VIBRATING MOTOR AND ELECTRONIC DEVICE

(71) Applicant: Goertek Inc., Weifang (CN)

(72) Inventors: Fenglei Zu, Weifang (CN); Yong Li, Weifang (CN)

(73) Assignee: Goertek Inc., Weifang (CN)

( * ) Notice: Subject to any disclaimer, the term of this patent is extended or adjusted under 35 U.S.C. 154(b) by 109 days.

(21) Appl. No.: 15/752,298

(22) PCT Filed: Dec. 11, 2015

(86) PCT No.: PCT/CN2015/097111
§ 371 (c)(1),
(2) Date: Feb. 13, 2018

(87) PCT Pub. No.: WO2017/028410
PCT Pub. Date: Feb. 23, 2017

(65) Prior Publication Data
US 2018/0241292 A1  Aug. 23, 2018

(30) Foreign Application Priority Data
Aug. 18, 2015 (CN) .................... 2015 2 0624621 U

(51) Int. Cl.
*H02K 33/02* (2006.01)
*H02K 33/16* (2006.01)

(52) U.S. Cl.
CPC ............. *H02K 33/02* (2013.01); *H02K 33/16* (2013.01)

(58) Field of Classification Search
CPC ........ H02K 33/02; H02K 33/16; H02K 15/00; H02K 41/0354; H02N 2/02

(Continued)

(56) References Cited

U.S. PATENT DOCUMENTS

2005/0127759 A1* 6/2005 Kraus ................ B26B 19/28
310/36
2012/0187780 A1 7/2012 Bang et al.
(Continued)

FOREIGN PATENT DOCUMENTS

CN 102611272 A 7/2012
CN 102761226 A 10/2012
(Continued)

OTHER PUBLICATIONS

International Bureau of WIPO, International Search Report and Written Opinion in Application No. PCT/CN2015/097111 dated May 9, 2016.

*Primary Examiner* — Thomas Truong
(74) *Attorney, Agent, or Firm* — LKGlobal | Lorenz & Kopf, LLP

(57) ABSTRACT

A vibrating motor and an electronic device are disclosed. The vibrating motor comprises a housing formed by an upper housing and a lower housing. A slider portion and a stator portion are accommodated in a cavity enclosed by the housing. The slider portion comprises magnets, spring sheets and a mass block. The mass block has accommodating grooves matching the external contour of the magnets, and the magnets are accommodated in the accommodating grooves. The mass block is connected to the upper housing via the spring sheets, and is suspended inside the housing. The stator portion comprises coils and a basin frame that is made of a magnetic material The basin frame is fixed on the lower housing, and has accommodating structures matching the external contour of the coils. The coils are embedded in the accommodating structures of the basin frame.

16 Claims, 2 Drawing Sheets

(58) Field of Classification Search
USPC .................................................. 310/25, 12.16
See application file for complete search history.

(56) References Cited

U.S. PATENT DOCUMENTS

| | | |
|---|---|---|
| 2016/0254736 A1 | 9/2016 | Jin et al. |
| 2017/0033654 A1* | 2/2017 | Wang ..................... H02K 33/16 |
| 2017/0288524 A1* | 10/2017 | Jin ........................... H02K 5/04 |

FOREIGN PATENT DOCUMENTS

| | | |
|---|---|---|
| CN | 103762815 A | 4/2014 |
| WO | 2010123288 A2 | 10/2010 |

* cited by examiner

VIBRATING MOTOR AND ELECTRONIC DEVICE

CROSS REFERENCE TO RELATED APPLICATIONS

This Application is a U.S. National Stage entry under 35 U.S.C. § 371 based on International Application No. PCT/CN2015/097111, filed on Dec. 11, 2015, which was published under PCT Article 21(2) and which claims priority to Chinese Patent Application No. 201520624621.7, filed on Aug. 18, 2015 which are all hereby incorporated in their entirety by reference.

TECHNICAL FIELD

This Application pertains to the technical field of mechanics, and particularly pertains to a vibrating motor and an electronic device.

BACKGROUND

Presently, typical vibrating motors are simply coil driven, but the magnetic induction lines in the electromagnetic induction area are freely divergent, which causes the waste of many magnetic induction lines. Therefore, a magnetic conductive medium is required to restrict the magnetic induction lines and increase the utilization ratio of magnetic field. In addition, other objects, desirable features and characteristics will become apparent from the subsequent summary and detailed description, and the appended claims, taken in conjunction with the accompanying drawings and this background.

SUMMARY

This Application provides a vibrating motor and an electronic device, to solve the problem in the prior art that the utilization ratio of magnetic induction lines is low.

To achieve the above object, the technical solutions of this Application are as follows.

In an aspect, this Application provides a vibrating motor including, but not limited to, a housing formed by an upper housing and a lower housing, a slider portion and a stator portion are accommodated in a cavity enclosed by the housing; the slider portion comprises: magnets, spring sheets and a mass block; the mass block has an accommodating grooves matching the external contour of the magnets, the magnets are accommodated in the accommodating grooves, spring sheets are provided at two sides of the upper housing 1 respectively, and the mass block 8 is connected to the upper housing via the spring sheets and is suspended inside the housing; the stator portion comprises coils, and further comprises a basin frame made of a magnetic material; the basin frame is fixed on the lower housing, and has accommodating structures matching the external contour of the coils, and the coils are embedded in the accommodating structures of the basin frame.

Optionally, the spring sheets are of an unclosed elliptical shape, and comprise an inner plane and an outer plane that have a certain gap therebetween and an elastic connecting part that is located symmetrically between the inner plane and the outer plane; the inner plane is welded at a side end face of the mass block, and the outer plane is welded at an inner surface of the upper housing; the inner plane and the outer plane are parallel, and are both parallel to the side end face of the mass block.

Optionally, the slider portion further comprises a washer plate fixed to an upper surface of the mass block, and the washer plate is made of a magnetic conductive metal material and is for preventing flux leakage.

Optionally, the slider portion further comprises edge washers, both the edge washers and the magnets are accommodated in the accommodating grooves of the mass block, and the edge washers are located at an upper side of the magnets and flush with an upper surface of the mass block; the edge washers are made of a magnetic conductive material and are for preventing flux leakage.

Optionally, the distance between an upper surface of the basin frame and a lower surface of the mass block is between 0.05 mm-0.3 mm.

Optionally, the basin frame is made of a soft magnetic ferrite material.

Optionally, an enameled wire of the coils is a copper wire coated with a rubber material.

Optionally, the mass block is made of a tungsten alloy material, the magnets are made of a permanent magnet material, and the spring sheets are made of a ductile metal material.

In another aspect, this Application further provides an electronic device comprising the vibrating motor provided by the above technical solutions.

The advantageous effects of the embodiments of this Application are as follows. In the vibrating motor and the electronic device disclosed in this Application, the coils are embedded into the basin frame made of a magnetic conductive material, and the freely divergent magnetic induction lines are concentrated and restricted in the magnetic conductive material by using the basin frame, and are transferred to the slider portion of the vibrating motor. Thereby the utilization ratio of the magnetic induction lines is increased, and the vibration performance of the motor is improved remarkably.

The above description is only an overview of the technical solutions of this Application. In order to understand the technical means of this Application more clearly, embodiments of this Application are provided below.

BRIEF DESCRIPTION OF THE DRAWINGS

The present invention will hereinafter be described in conjunction with the following drawing figures, wherein like numerals denote like elements, and.

The drawings are intended to provide a further understanding of this Application, and constitute a part of the description. The drawings are intended to interpret this Application along with the embodiments of this Application, and are not used to limit this Application. In the drawings.

Figure 1:
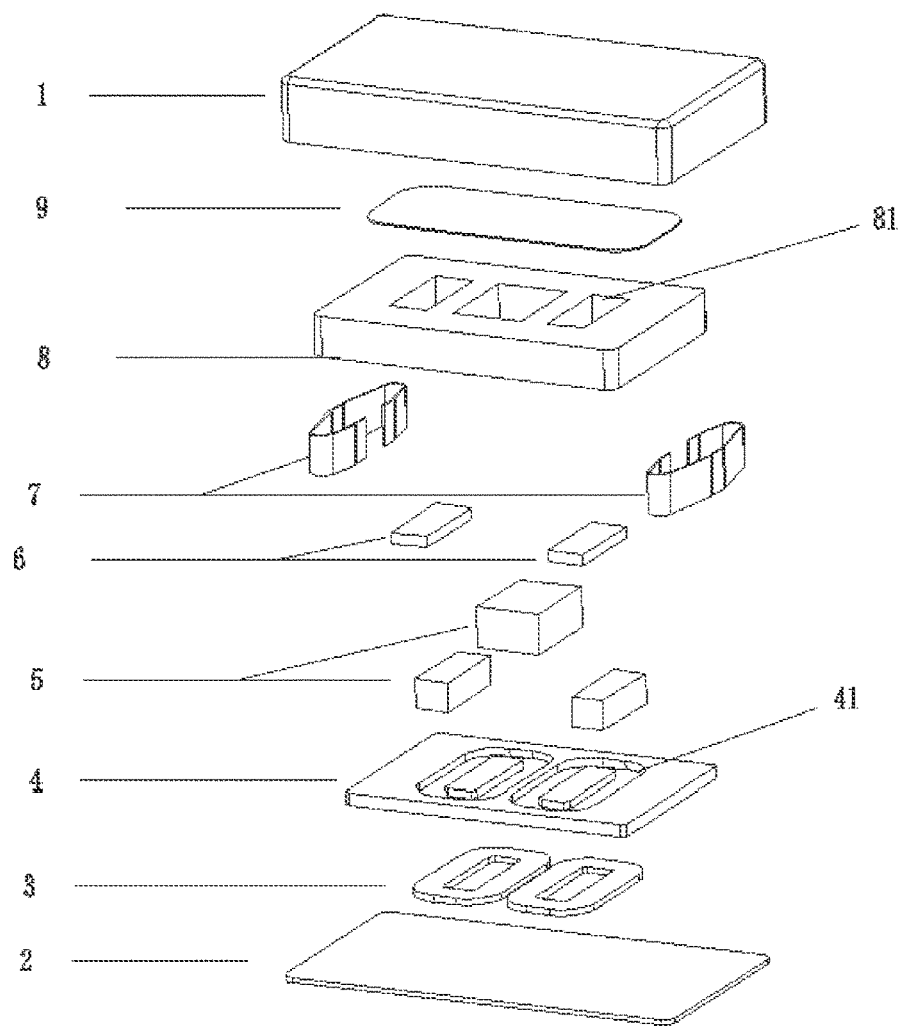
FIG. 1 is an exploded view of a vibrating motor according to an embodiment of this Application.

In the drawings: 1. upper housing; 2. lower housing; 3. coils; 4. basin frame; 41. accommodating structures; 5. magnets; 6. edge washers; 7. spring sheets; 71. inner plane;

72. outer plane; 73. elastic connecting part; 8. mass block; 81. accommodating grooves; and 9. washer plate.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, technical solutions and advantages of this Application clearer, the embodiments of this Application will be described below in further detail in conjunction with the drawings.

First, the terms regarding orientations involved in the particular embodiments are briefly explained. In the present embodiment, the left and right, front and back directions of the vibrating motor are defined in the normal operating state of the vibrating motor, the vibration direction of the vibrating motor is the left and right direction, the thickness direction of the vibrating motor is the up and down direction, the side where the mass block is located is the upper direction of the vibrating motor, and the side where the coils are located is the lower direction of the vibrating motor.

Figure 2:
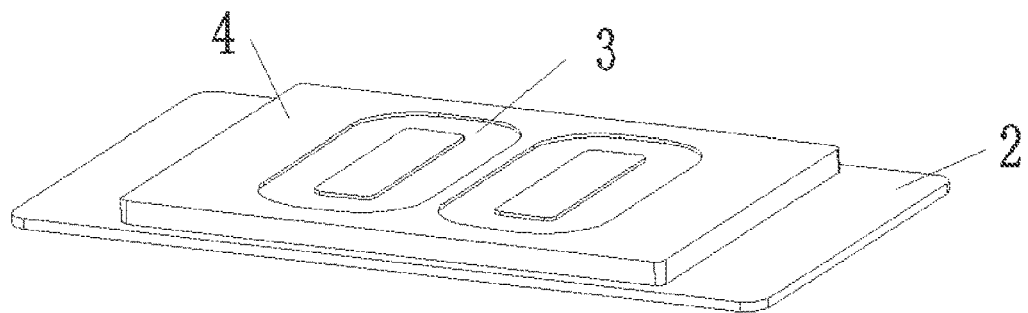
FIG. 2 is a schematic diagram of the state that a basin frame is fixed to an upper housing according to an embodiment of this Application.
Figure 3:
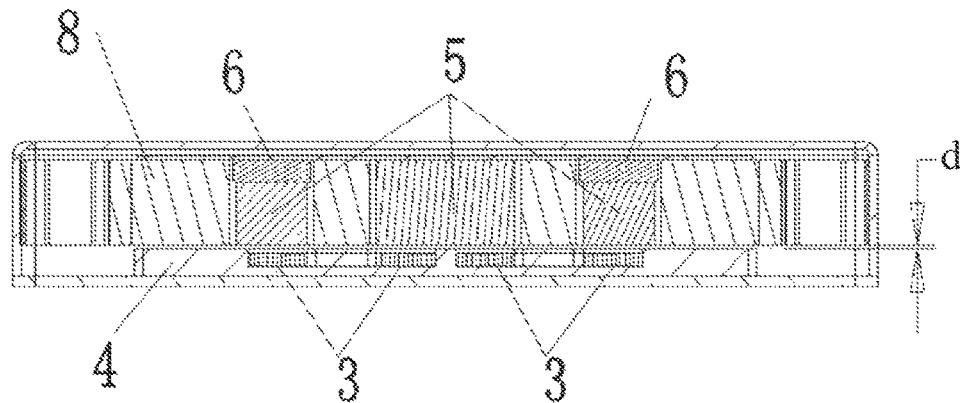
FIG. 3 is a sectional view of a vibrating motor according to an embodiment of this Application.
Figure 4:
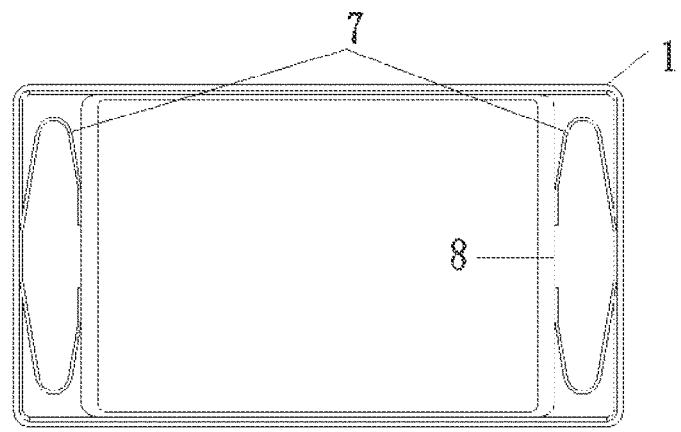
FIG. 4 is a top view of a vibrating motor according to an embodiment of this Application.

FIG. 1 is an exploded view of a vibrating motor according to an embodiment of this Application. FIG. 2 is a schematic diagram of the state that a basin frame is fixed to an upper housing according to an embodiment of this Application. FIG. 3 is a sectional view of a vibrating motor according to an embodiment of this Application. FIG. 4 is a top view of a vibrating motor according to an embodiment of this Application.

As shown in FIG. 1 to FIG. 4, the vibrating motor of the present embodiment comprises a housing formed by an upper housing 1 and a lower housing 2. A slider portion and a stator portion are accommodated in a cavity enclosed by the housing.

The slider portion comprises: magnets 5, spring sheets 7 and a mass block 8; the mass block 8 has an accommodating grooves 81 matching the external contour of the magnets 5, and the magnets 5 are accommodated in the accommodating grooves 81; at least one spring sheet 7 is provided at two sides of the upper housing 1 respectively, and the mass block 8 is connected to the upper housing 1 via the spring sheets 7 and is suspended inside the housing.

The stator portion comprises coils 3 and a basin frame 4 made of a magnetic material, the basin frame 4 is fixed on the lower housing 2 and has an accommodating structures 41 matching the external contour of the coils 3, and the coils 3 are embedded in the accommodating structures 41 of the basin frame 4.

The distance between an upper surface of the basin frame 4 and a lower surface of the mass block 8 is between 0.05 mm-0.3 mm. In the present embodiment, preferably, as shown in FIG. 3, the distance d between the upper surface of the basin frame 4 and the lower surface of the mass block 8 is not greater than 0.1 mm, to transfer the magnetic induction lines to the magnetic field of the slider portion to the maximum extent.

Optionally, in the present embodiment, the basin frame 4 is made of a soft magnetic conductive ferrite material, an enameled wire of the coils 3 is a copper wire coated with a rubber material, the mass block 8 is made of a tungsten alloy material, the magnets 5 are made of a permanent magnet material, and the spring sheets 7 are made of a ductile metal material.

In the vibrating motor of the present embodiment, the coils are embedded into the basin frame made of a magnetic conductive material, and the freely divergent magnetic induction lines are concentrated and restricted in the magnetic conductive material by using the basin frame, and are transferred to the slider portion of the vibrating motor. Thereby the utilization ratio of the magnetic induction lines is increased, and the vibration performance of the motor is improved remarkably.

Figure 5:
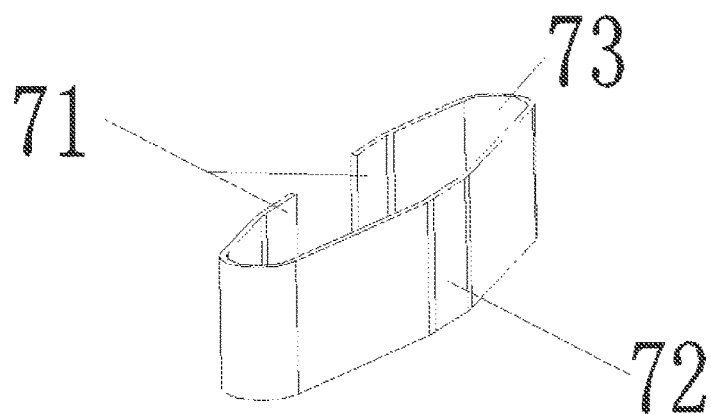
FIG. 5 is a schematic structure diagram of spring sheets according to an embodiment of this Application.

In a preferable embodiment of the present embodiment, as shown in FIG. 5, the spring sheets 7 of the vibrating motor are of an unclosed elliptical shape, and comprise an inner plane 71 and an outer plane 72 that have a certain gap therebetween and an elastic connecting part 73 that is located symmetrically between the inner plane 71 and the outer plane 72.

The inner plane 71 is welded at a side end face of the mass block 8, and the outer plane 72 is welded at an inner surface of the upper housing 1; the inner plane 71 and the outer plane 72 are parallel, and are both parallel to the side end face of the mass block 8.

As shown in FIG. 4, in the present preferable embodiment, the mass block is connected to the upper housing of the vibrating motor via the symmetrical spring sheets, and the symmetry of the spring sheets can provide stable support for the vibration of the mass block.

In another preferable embodiment of the present embodiment, as shown in FIG. 1, the slider portion of the vibrating motor further comprises a washer plate 9 that is fixed to an upper surface of the mass block 8, and the washer plate 9 is made of a magnetic conductive metal material and is for preventing flux leakage.

In still another preferable embodiment of the present embodiment, as shown in FIG. 3, the slider portion of the vibrating motor further comprises edge washers 6, both the edge washers 6 and the magnets 5 are accommodated in the accommodating grooves 81 of the mass block 8, and the edge washers 6 are located at an upper side of the magnet 5 and flush with an upper surface of the mass block 8; the edge washers 6 are made of a magnetic conductive material and are for preventing flux leakage.

Referring to FIG. 3, FIG. 3 exemplarily shows a vibrating motor structure that has two sets of coils and three magnets. The magnets located at the left and right sides of the middle magnet are provided with an edge washer 6 respectively, and the edge washers 6 can effectively prevent the flux leakage at the edge positions.

On the basis of the same design concept as that of the above vibrating motor, this Application further provides an electronic device, comprising the vibrating motor that is provided by the above embodiments.

In conclusion, this Application provides a vibrating motor and an electronic device. According to the vibrating motor, the coils are embedded into the basin frame made of a magnetic conductive material, and the freely divergent magnetic induction lines are concentrated and restricted in the magnetic conductive material by using the basin frame, and are transferred to the slider portion of the vibrating motor. Thereby the utilization ratio of the magnetic induction lines is increased, and the vibration performance of the motor is improved remarkably.

The above description is merely preferable embodiments of this Application, and is not used to limit the protection scope of this Application. Any modifications, equivalent substitutions or improvements that are made within the spirit and principle of this Application are all included in the protection scope of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vibrating motor comprising a housing formed by an upper housing and a lower housing, a slider portion and a stator portion are accommodated in a cavity enclosed by the housing;
   the slider portion comprises: magnets, spring sheets and a mass block;
   the mass block has accommodating grooves matching an external contour of the magnets, the magnets are accommodated in the accommodating grooves, the spring sheets are provided at two sides of the upper housing respectively, and the mass block is connected to the upper housing via the spring sheets and is suspended inside the housing;
   the stator portion comprises coils,
   wherein the stator portion further comprises a basin frame made of a magnetic material; the basin frame is fixed on the lower housing and has accommodating structures matching an external contour of the coils, and the coils are embedded in the accommodating structures of the basin frame.

2. The vibrating motor according to claim 1, wherein the spring sheets are of an unclosed elliptical shape, and comprise an inner plane and an outer plane that have a certain gap therebetween and elastic connecting parts that is located symmetrically between the inner plane and the outer plane;
   the inner plane is welded at a side end face of the mass block, and the outer plane is welded at an inner surface of the upper housing; and
   the inner plane and the outer plane are parallel, and are both parallel to the side end face of the mass block.

3. The vibrating motor according to claim 1, wherein the slider portion further comprises a washer plate fixed to an upper surface of the mass block, and the washer plate is made of a magnetic conductive metal material and is for preventing flux leakage.

4. The vibrating motor according to claim 1, wherein the slider portion further comprises edge washers, both the edge washers and the magnets are accommodated in the accommodating grooves of the mass block, and the edge washers are located at an upper side of the magnet and flush with an upper surface of the mass block; and the edge washers are made of a magnetic conductive material and are for preventing flux leakage.

5. The vibrating motor according to claim 1, wherein a distance between an upper surface of the basin frame and a lower surface of the mass block is between 0.05 mm-0.3 mm.

6. The vibrating motor according to claim 1, wherein the basin frame is made of a soft magnetic conductive ferrite material.

7. The vibrating motor according to claim 1, wherein an enameled wire of the coils is a copper wire coated with a rubber material.

8. The vibrating motor according to claim 1, wherein the mass block is made of a tungsten alloy material, the magnets are made of a permanent magnet material, and the spring sheets are made of a ductile metal material.

9. An electronic device, wherein the electronic device comprises a vibrating motor, the vibrating motor comprising a housing formed by an upper housing and a lower housing, a slider portion and a stator portion are accommodated in a cavity enclosed by the housing,
   the slider portion comprises: magnets, spring sheets and a mass block;
   the mass block has accommodating grooves matching an external contour of the magnets, the magnets are accommodated in the accommodating grooves, the spring sheets are provided at two sides of the upper housing respectively, and the mass block is connected to the upper housing via the spring sheets and is suspended inside the housing;
   the stator portion comprises coils;
   wherein the stator portion further comprises a basin frame made of a magnetic material, the basin frame is fixed on the lower housing and has accommodating structures matching an external contour of the coils, and the coils are embedded in the accommodating structures of the basin frame.

10. The electronic device according to claim 9, wherein the spring sheets are of an unclosed elliptical shape, and comprise an inner plane and an outer plane that have a certain gap therebetween and elastic connecting parts that is located symmetrically between the inner plane and the outer plane;
    the inner plane is welded at a side end face of the mass block, and the outer plane is welded at an inner surface of the upper housing, and
    the inner plane and the outer plane are parallel, and are both parallel to the side end face of the mass block.

11. The electronic device according to claim 9, wherein the slider portion further comprises a washer plate fixed to an upper surface of the mass block, and the washer plate is made of a magnetic conductive metal material and is for preventing flux leakage.

12. The electronic device according to claim 9, wherein the slider portion further comprises edge washers, both the edge washers and the magnets are accommodated in the accommodating grooves of the mass block, and the edge washers are located at upper side of the magnet and flush with upper surface of the mass block, and the edge washers are made of a magnetic conductive material and are for preventing flux leakage.

13. The electronic device according to claim 9, wherein a distance between an upper surface of the basin frame and a lower surface of the mass block is between 0.05 mm-0.3 mm.

14. The electronic device according to claim 9, wherein the basin frame is made of a soft magnetic conductive ferrite material.

15. The electronic device according to claim 9, wherein an enameled wire of the coils (3) is a copper wire coated with a rubber material.

16. The electronic device according to claim 9, wherein the mass block is made of a tungsten alloy material, the magnets are made of a permanent magnet material, and the spring sheets are made of a ductile metal material.

* * * * *